United States Patent

[11] 3,620,711

| [72] | Inventor | Brian Graham White<br>Bracknell, England |
|---|---|---|
| [21] | Appl. No. | 743,943 |
| [22] | Filed | July 11, 1968 |
| [45] | Patented | Nov. 16, 1971 |
| [73] | Assignee | Imperial Chemical Industries Limited<br>London, England |
| [32] | Priority | July 18, 1967 |
| [33] | | Great Britain |
| [31] | | 32,934/67 |

[54] HERBICIDAL PROCESS AND COMPOSITIONS FOR USE THEREIN
9 Claims, No Drawings

[52] U.S. Cl. ........................................................ 71/94,
260/247.5, 260/270, 260/271, 260/290,
260/294.8, 260/294.9, 260/295, 260/297

[51] Int. Cl. ..................................................... A01n 9/12,
A01n 9/22

[50] Field of Search .......................................... 71/94, 97,
128; 260/270, 271

[56] References Cited
UNITED STATES PATENTS

| 1,629,819 | 5/1927 | Hughes .......................... | 71/128 |
|---|---|---|---|
| 1,924,107 | 8/1933 | Chipman ....................... | 71/128 |
| 2,076,917 | 4/1937 | Pfuetzer ........................ | 71/128 |
| 2,798,069 | 7/1957 | Schaeffer ...................... | 260/270 |
| 3,040,051 | 6/1962 | Jubb .............................. | 260/296 |
| 3,040,052 | 6/1962 | Jubb .............................. | 260/270 |
| 3,053,912 | 9/1962 | Marchant ...................... | 260/270 |
| 3,189,610 | 6/1965 | Duffy ............................ | 260/270 |
| 3,251,839 | 5/1966 | Downes et al. ................ | 71/94 |
| 3,254,102 | 5/1966 | Swanson ....................... | 260/429 |
| 3,254,103 | 5/1966 | Melby et al. .................. | 260/429.2 |
| 3,280,128 | 10/1966 | Harrison ....................... | 71/94 |
| 3,313,792 | 4/1967 | Duck et al. ................... | 260/94.3 |
| 3,365,275 | 1/1968 | Muetterties ................... | 23/204 |

*Primary Examiner*—Lewis Gotts
*Assistant Examiner*—G. Hollrah
*Attorney*—Cushman, Darby and Cushman

ABSTRACT: Herbicidally effective complexes of 4,4'- and 2,2'-bipyridylium quaternary salts with salts of transition metals.

HERBICIDAL PROCESS AND COMPOSITIONS FOR USE THEREIN

This invention relates to processes for killing plants and to novel compositions containing a herbicidal bipyridylium salt for use therein. Bipyridylium salt herbicides have previously been made available for use in the form of aqueous solutions containing wetting agents and/or corrosion inhibitors, as described in British Pat. Nos. 813,531 and 913,413.

According to the present invention we provide a process of killing or severely damaging plants, which comprises applying to the plants a complex of a herbicidal bipyridylium ion with an ion of a transition metal (as hereinafter defined) and a halogen or pseudohalogen ligand.

We define a transition metal as a metal from Groups IIIA to VIIIA or IB to VIB of the Periodic Table according to Mendeleef and occuring in any of the first three long periods. This definition includes the rare earth metals.

Preferably, the complex used in the process according to the invention is formed from a transition metal ion selected from metals of atomic number from 25 to 28 inclusive, that is, from manganese, iron, cobalt and nickel.

More preferably, the complex used in the process according to the invention is formed from the 1,1'dimethyl-4,4'-bipyridylium ion.

In another aspect the invention provides a complex of a herbicidal bipyridylium ion with an ion of a transition metal selected from titanium, manganese, cobalt, nickel, zinc, mercury arsenic, selenium, antimony, tin, and bismuth, and a halogen or psuedohalogen ligand selected from chloride, bromide, iodide, cyanide, cyanate, thiocyanate, isothiocyanate and selenocyanate ions.

The complexes are solid crystalline materials and are generally brightly colored. They do not usually have sharp melting points, but decompose gradually above 200°C. Examples of herbicidal bipyridylium salts forming such complexes include the following:

1,1'-ethylene-2,2'-bipyridylium dibromide
1,1'-dimethyl-4,4'-bipyridylium dichloride
1,1'-di-2-hydroxyethyl-4,4'-bipyridylium dichloride
1,1'-bis-3,5 -dimethylmorpholinocarbonylmethyl-4,4'- bipyridylium dichloride
1-(2-hyroxyethyl)-1'-methyl-4,4'-bipyridylium dichloride
1,1'-di-carbamoylmethyl-4,4'-bipyridyliumdichloride
1,1'-di-N-methylacrbamoylmethyl-4,4'-bipyridylium dichloride
1,1'-bis-N-dimethylcarbamoylmethyl-4,4'-bipyridylium dichloride
1,1'-bisN,N-diethylcarbamoylmethyl-4,4'-bipyridylium dichloride
1,1'-diacetonyl-4,4'-bipyridylium dichloride
1,1'-diethoxycarbonylmethyl-4,4'-bipyridylium dibromide
1,1'-diallyl-4,4'-bipyridylium dibromide The bipyridylium slats listed above are all chlorides or bromides, in which from they are most commonly encountered. However, many other halides or pseudohalides, for example the iodides, thiocyanates or selenocyanates, may be employed forming the complexes of the invention.

Examples of transition metals which may be used to form complexes according to the present invention are titanium, manganese, colt, nickel, zinc, mercury, arsenic, selenium, antimony, tin, and bismuth.

Examples of halogen ligands are the chloride, bromide and iodide ions; examples of pseudohalogen ligands are cyanide, cyanate, thiocyanate, isothiocyanate and selenocyanate ions.

The complexes may have various formulas but the following are the most commonly met with:

$[B]^+$  $[MX_3]^{n-n}$  and  $[B]^{++}$  $[M_2X_6]^{n-n}$ wherein B is a herbicidal bipyridylium ion, M is a divalent transition metal ion and X is a halogen or psuedohalogens ligand.

The complexes may contain other ligands in addition to the halogens and pseudohalogens. For example, a third type of complex according to the invention has the formula:

$[B]^+$  $[M^IX_3R]^{n-n}$ wherein $M^I$ is a trivalent transition metal ion and R is a neutral ligand, e.g. $H_2O$, $NH_3$ or an amine molecule, for example pyridine. They may also contain other cations in addition to the bipyridylium ion, e.g. $K^+$.

The complexes are conveniently obtained by adding transition metal halides or pseudohalides in at least the stoichiometric quantity necessary to form the complex, to a solution of the bipridylium salt, for example an alcohol or alcohol/water solution. The temperature of the solution may be any temperature between 0° and 100° C., but may conveniently be the temperature of the room in which the preparation is carried out. Preferably the concentration of the bipyridylium slat in the solution is at least 10 percent w/v.

It is often desirable to incorporate a suitable wetting agent in bipyridylium slat herbicides, and such wetting agents may be added to the hot bipyridylium salt solution before the addition of the transition metal complexing agent.

The solids resulting are brightly colored crystalline materials, which incorporate the bulk of any water originally present in the bipyridylium slat solution as lattice hydration. Generally they can be pressed sufficiently free from residual solvent to yield an easily handleable crystalline product.

If desired the solid complex may be freed from solvent by conventional drying techniques; for example, drying for a few hours at 80° C. proves sufficient in some cases to cause virtually complete removal of solvent. This is important where solids containing a high concentration of bipyridylium ion are required, so that the cost of bulk transport may be minimized.

If desired, the solid complexes may be diluted with inert fillers. Suitable inert fillers include potassium chloride, potassium nitrite, sodium sulfate, magnesium sulfate and sucrose.

Solid complexes associated with inert filler may be prepared by:

a. adding, if desired, a surfactant-wetting component to the hot bipyridylium salt solution, b. maintaining the solution at an elevated temperature whilst transition metal salt is added, and c. maintaining the solution sufficiently hot to prevent solidification, where such may occur, whilst solid inert filler is added and dissolved.

The concentration of bipyridylium ion in the bipyridylium salt solution is preferably at least 10 percent w/v. The quantities of transition metal salt and inert filler which are added may be varied over quite large ranges, depending somewhat upon the complex and filler system being used.

Notably good results are obtainable by using as fillers the lower hydrated and anhydrous forms of hydrate-forming salts, e.g., magnesium sulfate. In this fashion solid blocks are obtainable. By varying the quantities of magnesium sulfate added one can vary the hardness of the formulations—the lower the quantity of magnesium sulfate added the softer the product, and the higher the overall bipyridylium ion concentration.

If during the cooling process the surface of the solution is agitated, small granules can be formed. These solid compositions can, if desired, be freed from solvent by conventional drying techniques.

Where the complex of the invention is readily soluble itself the formulations produced with magnesium sulfate with or without drying dissolve in cold water rapidly, and vary rapidly in warm water. Moreover, allowing for the variation of hardness with magnesium sulfate content, both dried and undried treatments yield easily handleable solids.

Suitable alcohols that may be used as diluents in the preparation of the complexes of the invention are, for example, methanol and ethanol. Water may be used alone in some cases.

Herbicidal compositions as described above have a number of advantages. Thus, these compositions, being solid, may be transported in plastic or paper sacks rather than watertight containers. A second advantage is that they may be prepared without the use of special machinery (i.e. for granulating).

Another advantage is that aqueous formulations of some of the complexes have reduced corrosivity. Although this feature is not required insofar as the compositions of the invention can be transported in nonmetallic containers, it is potentially useful preventing corrosion of metallic spray equipment.

The following examples illustrate the invention. In the examples, the 1,1'-dimethyl-4,4'-bipyridylium ion is referred to, for convenience, by its common name, paraquat.

EXAMPLE 1

This example illustrates the preparation of 1,1'-dimethyl-4,4'bipridylium tetrachlormanganate having the formula:

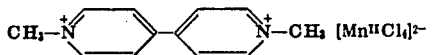

Paraquat dichloride (1.0 g. ) was dissolved in methanol (10 ml.) and a methanolic solution of manganese dichloride tetrahydrate (2.0 g. in 20 ml.) was added with continual stirring. A pale yellow solid precipitated and was filtered off and then dried in air.

EXAMPLE 2

This example illustrates the preparation of 1,1'-dimethyl-4,4'-bipyridylium tetrabromomanganate, having the formula:

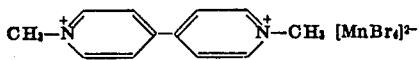

This was prepared in an analogous fashion to example 1 using paraquat dibromide and manganese dibromide, as reactants. The product was a yellow solid.

EXAMPLE 3

This example illustrate the preparation of 1,1'-dimethyl-4,4'-bipyridylium tetrachlorocobaltate, having the formula:

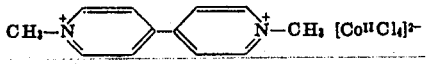

Paraquat dichloride (1.0 g.) in methanol (5 ml.) was treated while stirring continuously with a solution of cobaltous chloride hexahydrate (2.0 g.) in methanol ca. 20 ml.) A pale green solid deposited and was filtered off and dried in air. The solid complex was purified by washing with a small quantity of alcohol

EXAMPLE 4

This example illustrates the preparation of 1,1'-dimethyl-1,4'bipyridylium tetrabromocobaltate, having the formula:

This was prepared as in example 3, using paraquat dibromide and cobaltous bromide as reactants. The complex was a green microcrystalline solid.

EXAMPLE 5

This example illustrates the preparation of 1,1'-dimethyl-4,4'bipyridylium tetraiodocobaltate, having the formula:

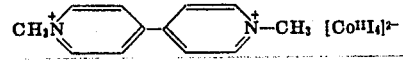

Cobaltous iodide (2.0 g.) was dissolved in methanol (25 ml.) with the aid of the minimum of added water, and treated with constant stirring with paraquat iodide (1.0 g.) in water (10 ml.) in a dropwise manner. The cobaltous complex separates as a reddish brown microcrystalline solid.

EXAMPLE 6

This example illustrates the preparation of 1,1'dimethyl-4,4'bipyridylium hexachloronickelate, having the formula:

Paraquat dichloride, (2.6 g.) dissolved in the minimum quantity of methanol, was treated with nickel dichloride hexahydrate (5.6 g.) in boiling ethanol (25 ml.) A green precipitate formed immediately, but changed rapidly to yellow. This material was filtered off, washed with methanol and dried in a desiccator. Drying at 100° C. for 2 hours regenerated the green anhydrous complex salt.

EXAMPLE 7

This example illustrates the preparation of 1,1'-bipyridylium tetrachlorizincate, having the formula:

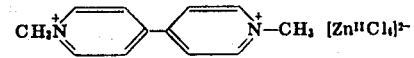

Paraquat dichloride (1.0 g.) in methanol (10 ml.) was continuously agitated while zinc chloride (2.0 g.) in methanol (20 ml.) was added. A white precipitate of the complex formed immediately, and was filtered off, washed with ethanol and dried in air.

EXAMPLE 8

This example illustrates the preparation of 1,1'-dimethyl-4,4'bipyridylium pentachloroarsenate, having the formula:

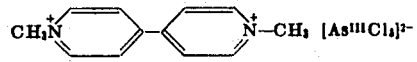

Paraquat dichloride (1.0 g.) in methanol (10 ml.) was continuously agitated while a methanolic solution of arsenic trichloride (1.0 g. in 20 ml.) was added. The yellow precipitate of the complex was filtered off, washed with ethanol and dried in a vacuum.

EXAMPLE 9

This example illustrates the preparation of 1,1'-dimethyl-4,4'bipyridylium hexachloroselenate having the formula:

Paraquat dichloride (2.0 g.) in methanol (10 ml.), was treated with a solution of selenic chloride (SeCl$_4$, 5.0 g.) in methanol (50 ml.). A yellow precipitate was formed immediately. This was filtered off, and dried in air, whereupon the complex changed to a buff color.

EXAMPLE 10

This example illustrates the preparation of 1,1'-bis-3,5 - dimethylmorpholino-carbonylmethyl-4,4'-bipyridylium tetrachloromercurate, having the formula:

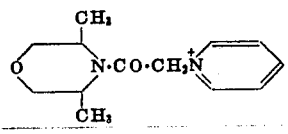

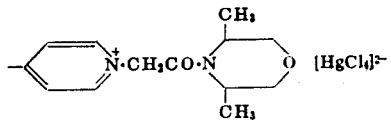

The quaternary chloride (2.0 g.) in methanol (20 ml.) was continuously stirred while a hot solution of mercuric chloride (2.0 g.) in methanol (20 ml.) was added. A sticky white solid complex precipitated and was triturated with ethanol, collected and dried in vacuo. The complex appeared to be hygroscopic.

EXAMPLE 11

This example illustrates the preparation of 1,1'-dimethyl-4,4'-bipyridylium cobaltisothiocyanate having the formula:

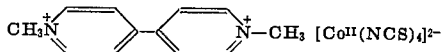

Cobaltous chloride (1.2 g.) in ethanol (15 ml.) was added to a solution of potassium thiocyanate (1.0 g.) in acetone (10 ml.). The precipitated potassium chloride was collected and the filtrate added slowly to a hot solution of paraquat thiocyanate (1.5 g.) dissolved in the minimum of aqueous methanol. On cooling, the resultant solution deposited fine green needles of the complex. These were filtered off, recrystallized from ethanol/methanol, and dried in air.

EXAMPLE 12

This example illustrates the preparation of 1,1'-dimethyl-4,4'bipyridylium hexachlormercurate having the formula:

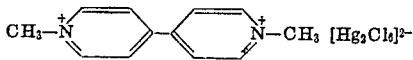

Mercuric chloride (5.5 g.) was dissolved in hot water (30 ml.) and a cold solution of paraquat dichloride (2.6 g.) in water (10 ml.) added with continuous agitation. A white precipitate of the complex formed, and was filtered off, washed with water and dried in air. Yield 7.5 g.

EXAMPLE 13

An important advantage is that when used as agents for killing plants, the complexes of this invention generally show improved biological efficiency in comparison with the uncomplexed bipyridylium herbicides by way of a prolongation and enchancement of their herbicidal effect. This is illustrated by the following tests.

The procedure used in the tests for evaluating phytotoxic effect was as follows. An aqueous solution containing a wetting agent and the test compound was sprayed at the rate stated in the test table below onto a number of replicated cocksfoot plants. The damage to the plants was assessed visually in comparison with controls at the intervals of time stated in the test tables below and the figures recorded in the test tables represent the average damage to the plants and are entered as "% Kill." The rates of application of the test compound are expressed in terms of pounds of dication per acre. For convenience, the paraquat ion is represented in the formulas in the test tables by the "PQ $^+$" Thus PQ$^{++}$2Cl $^{7E}$represents paraquat dichloride.

TEST TABLE 1

| Text compound | Rate of application (lbs./acre) | Percent kill after a period of— | | | |
|---|---|---|---|---|---|
| | | 1 week | 2 weeks | 3 weeks | 4 weeks |
| PQ$^{++}$2Cl$^-$ | One-fiftieth | 34 | 40 | 27 | 24 |
| PQ$^{++}$[FeCl$_4$]$^-$ | One-fiftieth | 37 | 41 | 36 | 36 |
| PQ$^{++}$[MnCl$_4$]$^=$ | One-fiftieth | 36 | 41 | 32 | 28 |

TEST TABLE 2

| Text compound | Rate of application (lbs./acre) | Percent kill after a period of— | | | |
|---|---|---|---|---|---|
| | | 1 week | 2 weeks | 3 weeks | 4 weeks |
| PQ$^{++}$2Cl$^-$ | One-fiftieth | 36 | 44 | 38 | 37 |
| PQ$^{++}$[Hg$_2$Cl$_6$]$^{2-}$ | One-fiftieth | 43 | 47 | 46 | 45 |
| PQ$^{++}$[CoCl$_4$]$^{2-}$ | One-fiftieth | 39 | 46 | 44 | 42 |
| PQ$^{++}$[FeCl$_5$H$_2$O]$^{2-}$ | One-fiftieth | 37 | 45 | 46 | 46 |

The difference in activity between the results of test tables 1 and 2 arise because the two sets of tests were conducted at different times and under different environmental conditions, when, as is well known, the herbicidal effect of the bipyridylium herbicides can show marked variations.

EXAMPLE 14

This example illustrates the preparation of a solid herbicidal composition comprising a complex of the 1,1'-dimethyl-4,4'-bipyridylium ion with the cupric ion.

1,1'-dimethyl-4,4'-bipyridylium dichloride dihydrate (1.3 g.) and cupric chloride dihydrate (1.7 g.) were stirred in water (3 ml.), and magnesium sulfate (6 g.) added. The mixture rapidly solidified to give a dark brown product, which could be readily dissolved in water in the proportion required for herbicidal application.

What is claimed is:

1. A method of inhibiting the growth of vegetation, which comprises applying to the vegetation a growth inhibiting amount of a complex of a herbicidal 2,2'-or 4,4'bipyridylium ion with an ion of a transition metal selected from the group consisting of titanium, manganese, iron, cobalt, copper nickel, cadmium, zinc, mercury, arsenic, selenium, antimony, tin, silver, lead and bismuth, and a ligand selected from the group consisting of chloride, bromide, iodide, cyanide, cyanate, thiocyanate, isothiocyanate and selenocyanate.

2. A method according to claim 1 in which the herbicidal bipyridylium ion is selected from the group consisting of 1,1'-dimethyl-4,4'-bipyridylium ion, 1,1'-ethylene- 2,2'-bipyridylium ion, and 1,1'-di(2 -hydroxyethyl) -4,4'-bipyridylium ion.

3. A method according to claim 2 in which the transition metal is selected from the group consisting of metal of atomic number 25 t0 28 inclusive.

4. A solid herbicidal composition, consisting essentially of an effective amount of a complex of a herbicidal, 2,2'- or 4,4'-bipyridylium ion with a transition metal selected from the group consisting of titanium, manganese, iron, cobalt, copper, nickel, cadmium, zinc, mercury, arsenic, selenium, antimony, tin, silver, lead and bismuth and a ligand selected from the group consisting of chloride, bromide, iodide, cyanide, cyanate, thiocyanate, isothiocyanate and selenocyanate, in admixutre with an inorganic slat containing water of crystallization acquired during initial mixing of the salt with the complex.

5. A solid herbicidal composition as claimed in claim 4, in which the salt containing water of crystallization is selected from magnesium sulfate and sodium sulfate.

6. A solid herbicidal composition as claimed in claim 5, which includes a wetting agent.

7. A herbicidal composition according to claim 4 wherein the herbicidal bipyridylium ion is selected from the group consisting of 1,1'-dimethyl-1,1'-bipyridylium ion, 1,1'-ethylene-2,2'-bipyridylium ion, and 1,1'di(2 hydroxyethyl)- 4,4'-bipyridylium ion and the transition metal ion is selected from the group consisting of metals of atomic number 25 to 28 inclusive.

8. A herbicidal composition according to claim 7 wherein the herbicidal bipyridylium ion is the 1,1'-dimethyl 4,4'-bipyridylium ion and the transition metal is manganese and cobalt 9. A solid herbicidal composition consisting essentially of an effective amount of a complex of a herbicidal 2,2'or 4,4'-bipyridylium ion with a transition metal selected from the group consisting of titanium, manganese, iron, cobalt, copper, nickel, cadmium, zinc, mercury, arsenic, selenium, antimony, tin, silver, lead and bismuth, and ligand selected from the group consisting of chloride, bromide, iodide, cyanide, cyanate, thiocyanate, isothiocyanate and selenocyanate, in admixture with a major proportion of a carrier for said complex.

\* \* \* \* \*